Figure 1:
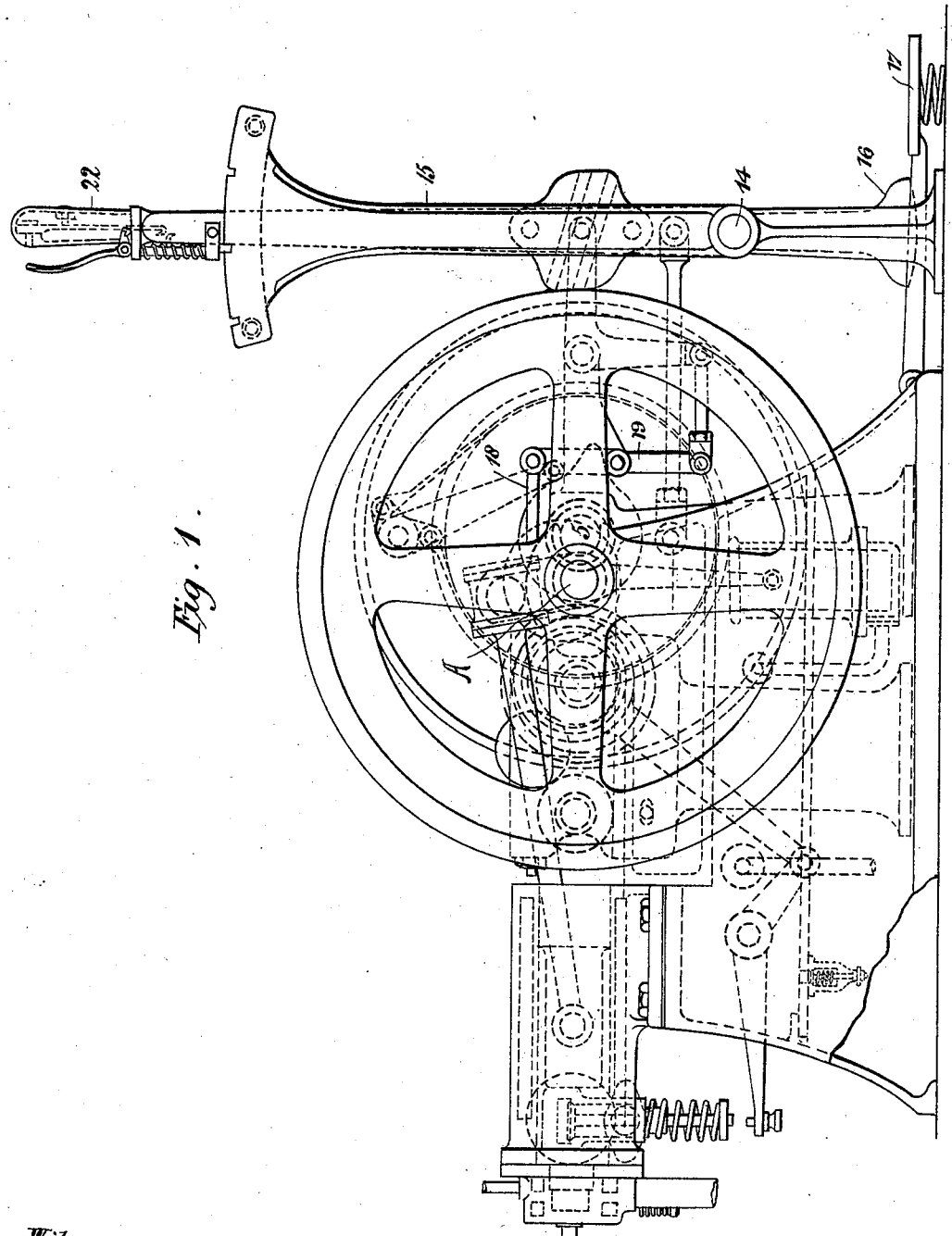

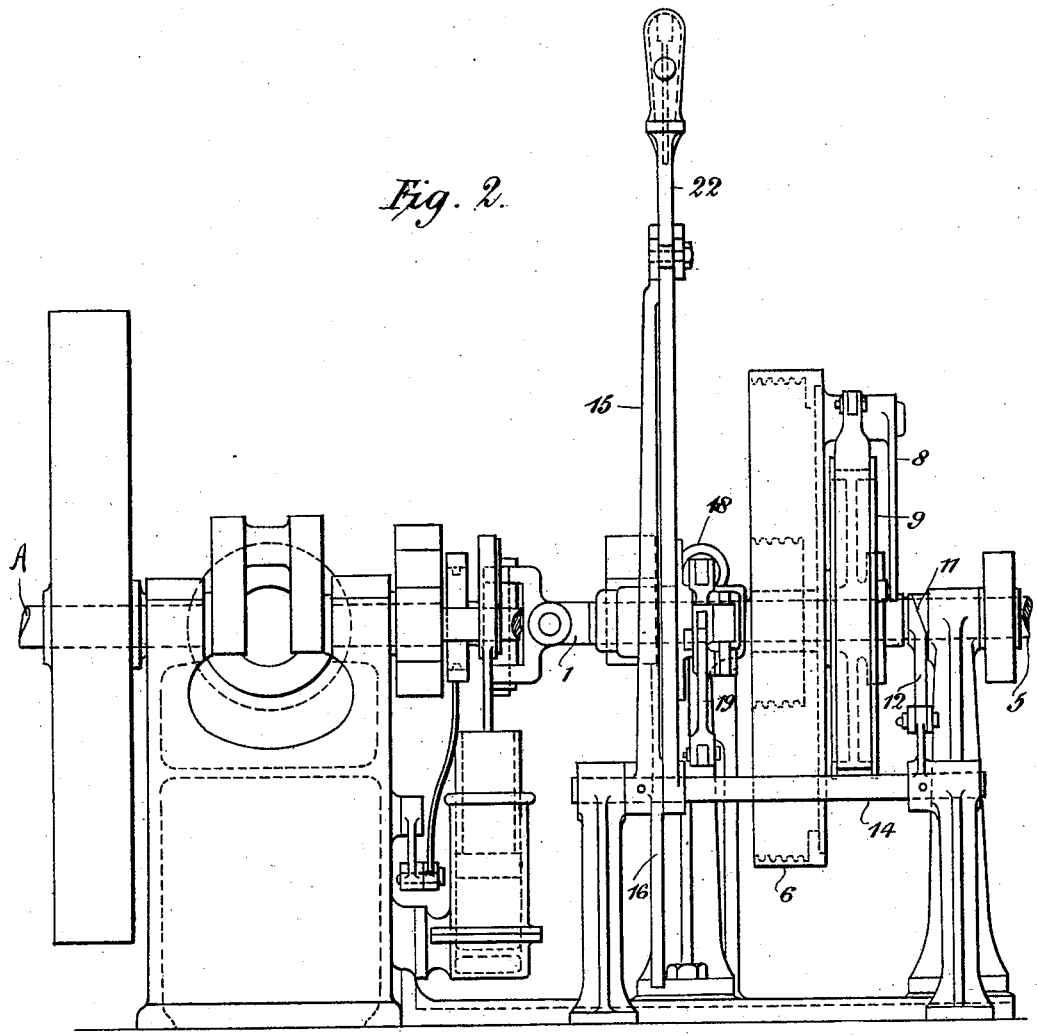

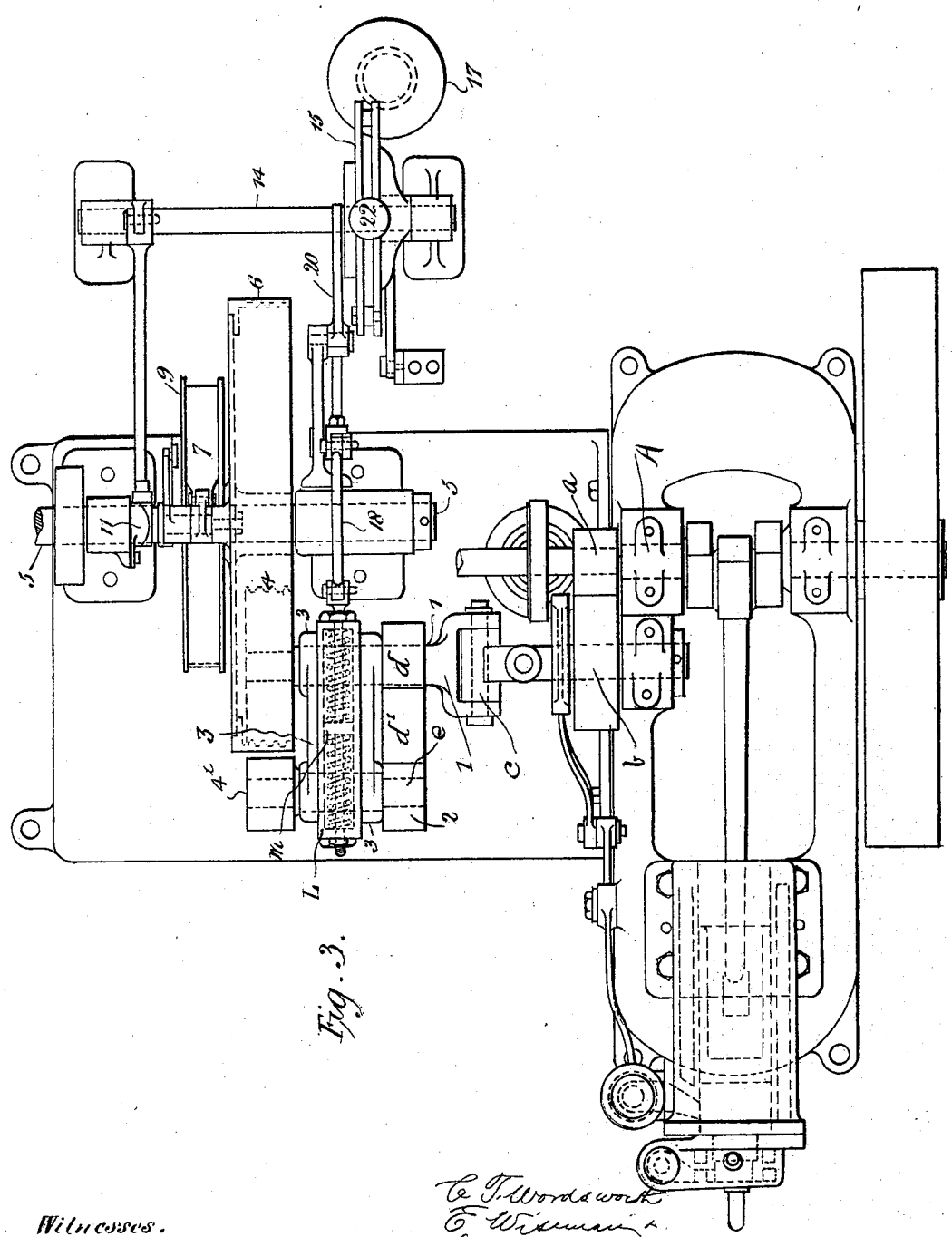

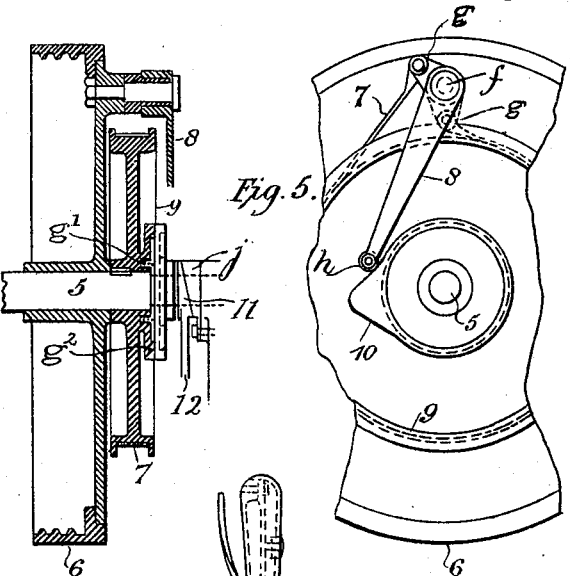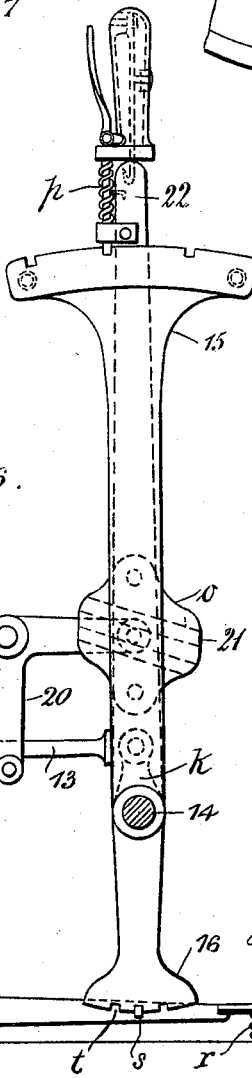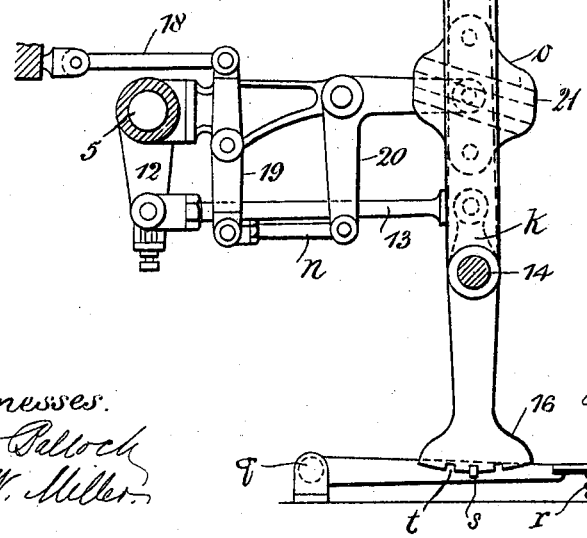

(No Model.) 6 Sheets—Sheet 5.
C. T. WORDSWORTH, E. WISEMAN & J. HOLROYD.
MECHANISM FOR TRANSMITTING MOTIVE POWER.
No. 588,625. Patented Aug. 24, 1897.
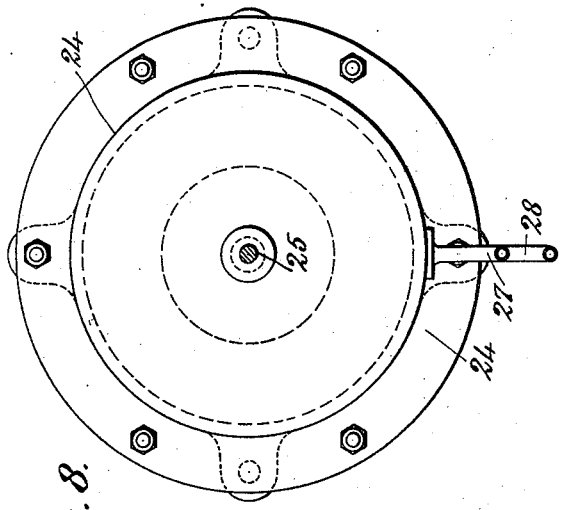
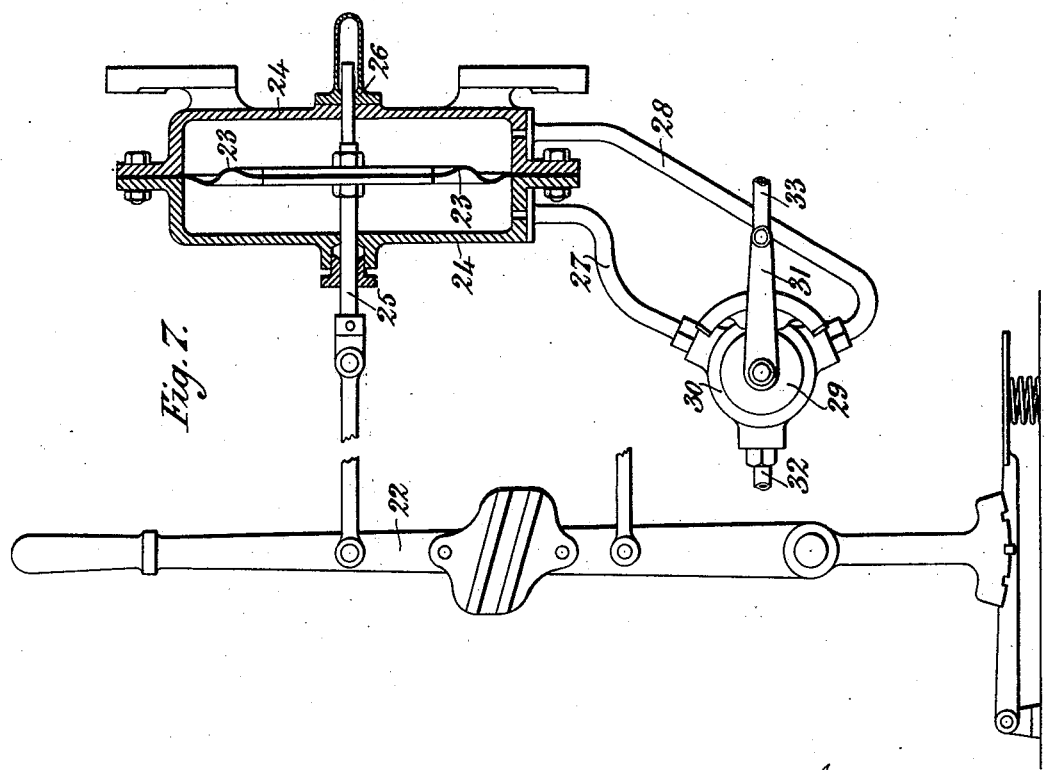
Witnesses.
Guy E. David.
E. A. Palloch.
Inventors
C. T. Wordsworth
Edmund Wiseman
John Holroyd
By their Attorneys
Baldwin Davidson Wight

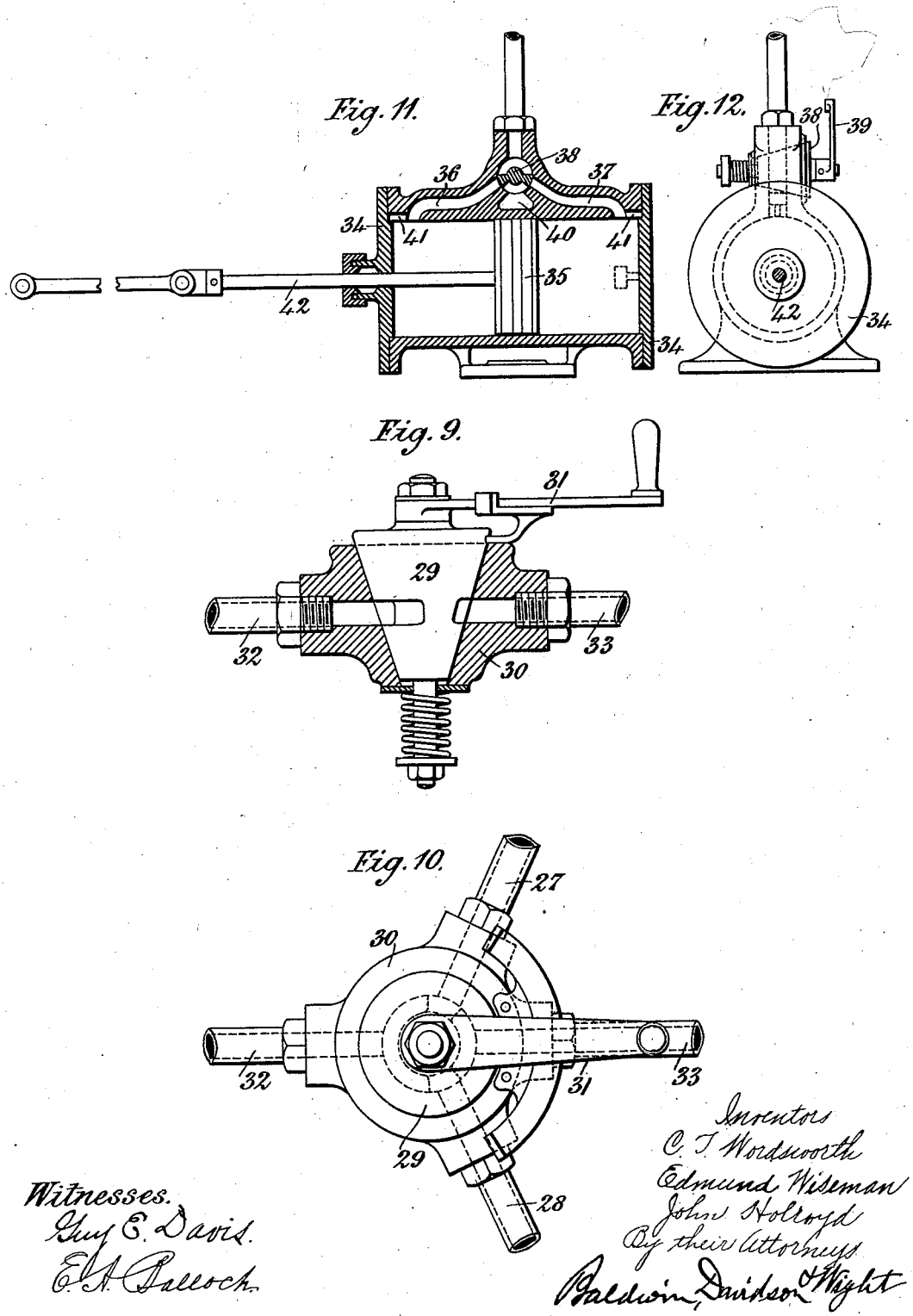

UNITED STATES PATENT OFFICE.

CHRISTOPHER THOMAS WORDSWORTH, OF MANCHESTER, EDMUND WISEMAN, OF LUTON, AND JOHN HOLROYD, OF LONDON, ENGLAND.

MECHANISM FOR TRANSMITTING MOTIVE POWER.

SPECIFICATION forming part of Letters Patent No. 588,625, dated August 24, 1897.

Application filed November 23, 1896. Serial No. 613,178. (No model.)

*To all whom it may concern:*

Be it known that we, CHRISTOPHER THOMAS WORDSWORTH, residing at 4 Corporation Street, Manchester, in the county of Lancaster, EDMUND WISEMAN, residing at Cheapside, Luton, in the county of Bedford, and JOHN HOLROYD, residing at 13 Alleyn Terrace, Park Road, West Dulwich, London, in the county of Surrey, England, engineers, subjects of the Queen of Great Britain, have invented certain new and useful Mechanism for Transmitting Motive Power, of which the following is a specification.

This invention relates to driving mechanism specially suitable for use with gas-motors and vapor-motors where it is necessary to provide for starting, stopping, and reversing a driven shaft, while the motor runs continuously.

According to our invention we provide improved mechanism for accomplishing these results.

In the accompanying drawings, Figure 1 is a side elevation of a motor having mechanism coupled with it by which to drive an automotor-carriage or other machine. Fig. 2 is an end elevation. Fig. 3 is a plan of the same. Figs. 4 and 5 are local sections showing the clutch-strap and its actuating-lever. Fig. 6 is an elevation of the hand-lever and its connections with the sliding block forming part of the reversing mechanism. Fig. 7 is a section of a pneumatic apparatus for controlling the lever 22. Fig. 8 is a front elevation of a part of the same. Fig. 9 is a sectional view of the controlling-tap shown in Fig. 7. Fig. 10 is a plan of the same. Fig. 11 is a section of a pneumatic cylinder for controlling the lever 22, and Fig. 12 is an end elevation of the same.

The motor may be of any approved construction and may be operated in any desired way. The motor shown is a gas-engine, whose main crank-shaft A is geared at $a$ to a counter-shaft $b$, driven at a slower speed. With either the crank-shaft or the slower-driven shaft (the latter preferred) a shaft 1 is connected by a universal joint $c$. This shaft carries a gear-wheel $d$ and a friction-pinion 4. The wheel $d$ gears by means of an intermediate wheel $d'$ with a pinion 2 on a shaft $e$, which carries a friction-pinion $4^\times$. Both shafts 1 and $e$ are mounted in a sliding block 3, arranged in any suitable manner on the frame of the motor. The friction-pinions 4 and $4^\times$ may be of the same or of different sizes, as the requirements may suggest, and are adapted to act upon a large wheel 6, having friction-surfaces on its inner and outer sides and mounted loosely on a shaft 5, which is the shaft to be driven. A lever 8 is pivoted at $f$ to the side of the wheel 6, and to arms $g$ of this lever are secured the two ends of a brake-strap 7 which surrounds a drum 9, fast on the shaft 5, and to drive the shaft the clutch-strap is made to clip the drum. This is effected by a cam 10, which operates on the lever 8. The cam is loose on the shaft 5 and is pressed in one direction by a spring $g'$, arranged in a recess in a flanged hub $g^2$, and the bowl $h$ at the end of the lever presses against the cam and carries it around with the wheel 6. When, however, resistance is opposed to the rotation of the cam 10, the bowl at the end of the lever 8 rides up the inclined surface of the cam and the strap is tightened upon the drum, which is then carried around together with the wheel 6, and so the shaft 5 is driven.

To start the shaft, the cam-piece is thrust laterally against the hub $g^2$ of the drum by means of a block 11, having an inclined side $i$, which coöperates with the inclined side of a stationary block $j$, secured to the frame of the machine. The block 11 can be turned around the shaft. The block 11 is formed in connection with an arm 12, which is connected by the rod 13 with an arm $k$ on the shaft 14. Fixed upon this shaft are the two quadrants 15 and 16, which are formed in one piece and which can be locked in either of three positions by the locking-treadle 17. The drawings show the quadrants locked in the middle position, and in this position the inclined blocks exert no lateral pressure, but the movement of the quadrants in either direction will turn the shaft 14 and by means of the connections just described will turn the movable inclined block 11 about the shaft 5 and cause the said block to ride up the fixed inclined block $j$. Thus resistance is offered to the rotation of the cam-piece 10, with the result that the lever 9 is turned and the strap is applied to the drum in the manner before explained, and thus the wheel 6 is clutched to the shaft 5. The direction of rotation is controlled by the position of the block 3. A spring-box L is mounted on the top of the block 3, and to a piston $m$ in this spring-box is attached a rod 18, which is jointed to the upper end of the rocking lever 19, the lower end of which is connected by a link $n$ to the bell-crank lever 20. The upper end of the bell-crank is pivoted in a die $o$, which can slide in an inclined slot 21, formed in connection with the hand-lever 22. The hand-lever is shown in the middle position, and in this position neither of the pinions 4 or $4^\times$ engages with the wheel 6. When the hand-lever is moved from this position, the die $o$, sliding in the inclined slot 21, causes movement of the block 3 and brings one or the other of the pinions 4 or $4^\times$ into gear, according to the direction in which the hand-lever is moved. The hand-lever and quadrants can be locked together by the well-known devices $p$, as shown.

In cases where it is inconvenient to use a hand-lever pneumatic apparatus may be provided to give the necessary movements. This apparatus may either consist of the diaphragm arrangement shown in Figs. 7, 8, 9, and 10 or the cylinders shown in Figs. 11 and 12. In the first of these 23 is a flexible diaphragm secured in a cylindrical casing 24. A spindle 25 is fixed to the diaphragm, one end of which is connected with the lever 22, and the other works in a bearing 26. Compressed air is admitted from the air-reservoir of a gas or oil engine or elsewhere to either side of the diaphragm by means of a tap, (shown in Figs. 9 and 10,) which controls the passage of air in the pipes 27 and 28, leading to and from each side of the diaphragm. This tap consists of a conical plug 29, turning in a shell 30 by means of a hand-lever 31.

32 is the pipe leading to the air-reservoir, and 33 is the exhaust-pipe.

In the apparatus shown in Figs. 11 and 12, 34 is a cylinder with a piston 35 working within it and having passages 36 and 37 for admitting compressed air to either side of the piston. 38 is a valve operated by the lever 39. The valve is so constructed that when one end of cylinder 34 is open to the air-supply the other is open to the exhaust-port 40. The ends of the passages 36 and 37, as is shown in Fig. 11, are set back from the end of the cylinder, and a narrow passage 41 is formed, so that the piston as it approaches the end of the cylinder is cushioned and brought gradually to rest. The piston-rod 42 is connected to the lever 22, as in the former case.

The treadle 17 may be of any approved construction. It is pivoted at $q$, pressed upwardly by a spring $r$, and provided with a lug $s$, adapted to engage the notches $t$ in the quadrant 16.

We claim as our invention—

1. The mechanism substantially as herein described for starting, stopping and controlling a driven shaft while the driving-motor may run continuously, comprising a shaft to be driven, a wheel loose on said shaft, a drum on said shaft close to said wheel, a strap encircling the drum, a lever attached to the wheel and connected with the strap, a cam loose on the shaft engaging the lever, and carried around thereby when the wheel revolves, and means for checking the rotation of the cam to cause it to act on the lever to tighten the strap.

2. The combination, substantially as set forth, of a wheel mounted on the driven shaft, a drum also mounted on said shaft, a lever pivoted to the wheel, a strap encircling the drum and connected with the lever, a cam for operating the lever, means for resisting the movement of the cam, the sliding block, the shafts and pinions which the said block carries and means for shifting the block to bring one pinion or another to gear with the driven wheel.

3. The combination, substantially as set forth, of a shaft, a wheel mounted loosely on said shaft, a drum keyed to the shaft, a strap encircling the drum, a lever pivoted to the wheel, connections between the strap and the lever, a cam engaging the end of the lever and carried around thereby when the wheel rotates, the inclined block $j$, the inclined block 11, interposed between the block $j$ and the cam, and means for rotating the block 11 to cause it to bear against the cam and check or retard the rotation thereof.

4. The combination, substantially as set forth, of the shaft to be driven, a wheel mounted loosely thereon, a drum keyed to the shaft, a lever pivoted to the wheel, a strap encircling the drum and having both ends connected with said lever, a cam engaging one end of the lever and carried around thereby when the wheel rotates, and means for retarding the rotation of the cam to cause it to act upon the lever to tighten the strap.

CHRISTOPHER THOMAS WORDSWORTH.
EDMUND WISEMAN.
JOHN HOLROYD.

Witnesses:
ROBERT B. RAUSFORD,
FRED C. HARIES.